Figure 4:
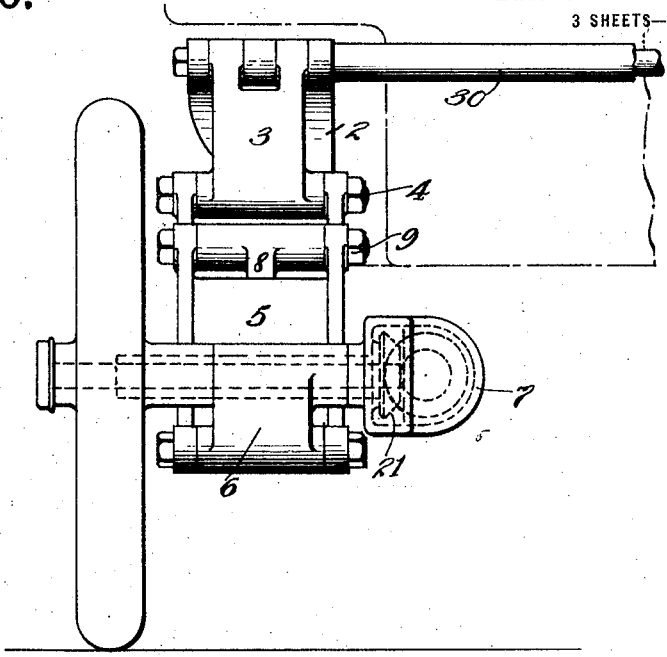

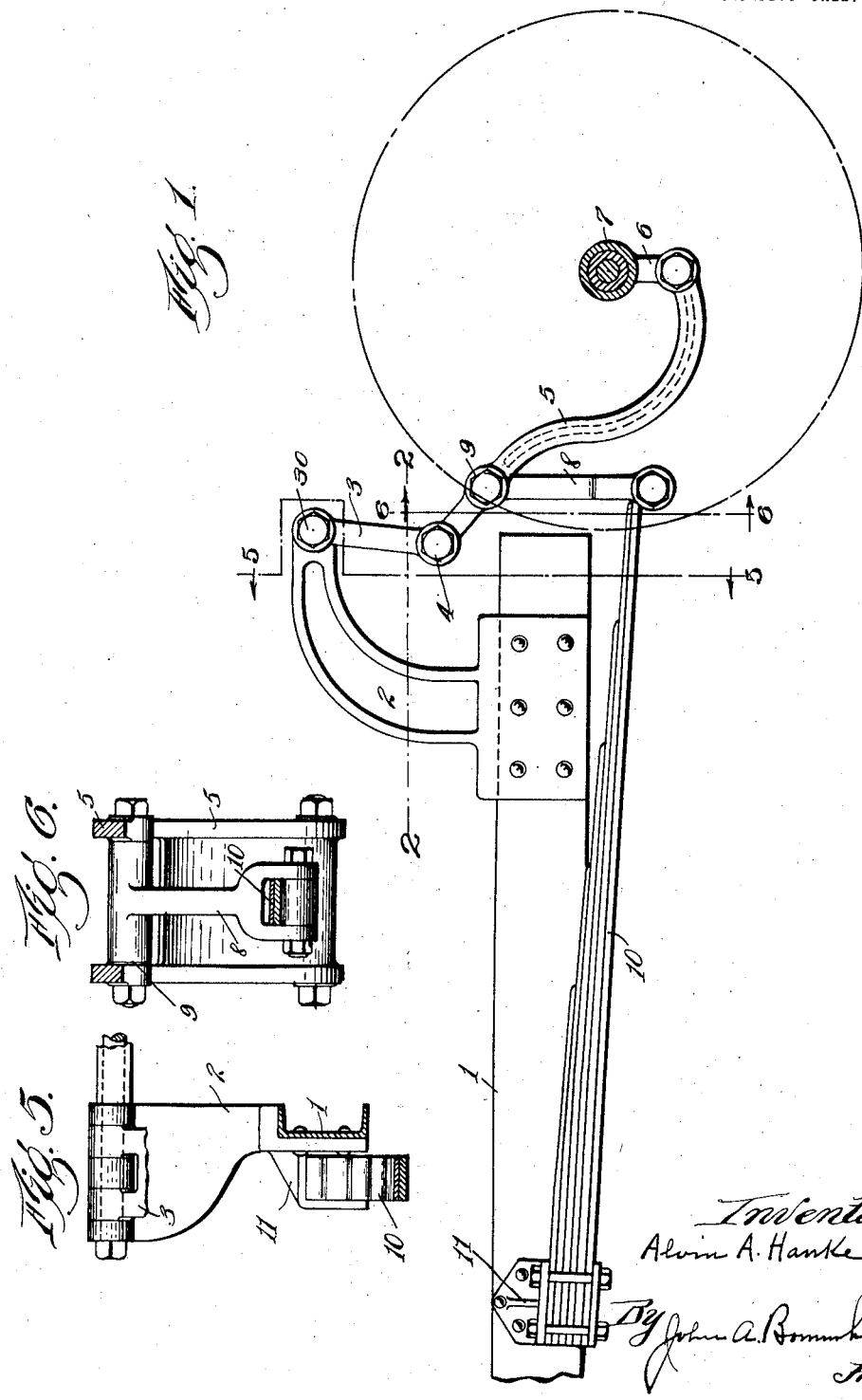

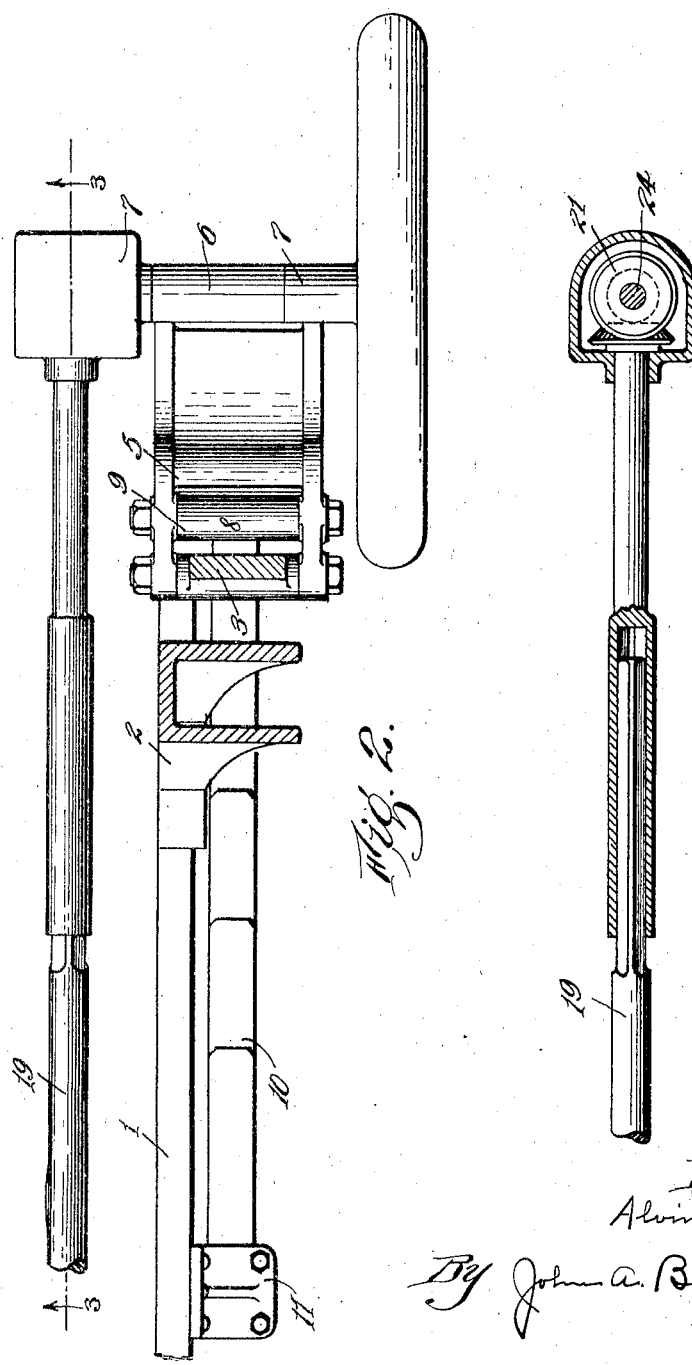

A. A. HANKE.
SPRING SUSPENSION.
APPLICATION FILED JUNE 21, 1919.

1,831,810.

Patented Feb. 24, 1920.

Inventor,
Alvin A. Hanke.
By John A. Bornhardt
Atty.

UNITED STATES PATENT OFFICE.

ALVIN A. HANKE, OF CLEVELAND, OHIO.

SPRING SUSPENSION.

1,331,810.   Specification of Letters Patent.   Patented Feb. 24, 1920.

Application filed June 21, 1919. Serial No. 305,827.

*To all whom it may concern:*

Be it known that I, ALVIN A. HANKE, a citizen of the United States, residing at Cleveland, in the county of Cuyahoga and State of Ohio, have invented certain new and useful Improvements in Spring Suspensions, of which the following is a specification.

This invention relates to a spring suspension for power driven vehicles and more particularly to that type of vehicle used for passenger service, although it may be applied, with slight modifications, to vehicles used for trucking.

It has for its principal object the provision of means whereby the horizontal as well as the vertical re-action of the wheels of the vehicle are absorbed without disturbing the line of motion of the body and the independent action of the wheels while performing this duty.

A further object of the invention is in the provision of means whereby variable independent re-action of the wheels when encountering different sizes of obstructions is consumed without disturbing the line of motion of the body.

The foregoing may be accomplished in the embodiment of my invention shown in the drawings forming part of this specification.

In the drawings, wherein like reference numerals designate similar parts throughout the various views, Figure 1 is a side elevation of the device shown applied to the rear wheels of the vehicle, the wheels being indicated in the figure in a dot and dash line; Fig. 2 is a sectional plan indicated by the line 2—2 of Fig. 1; Fig. 3 is a sectional detail of the driving mechanism as indicated by the line 3—3 of Fig. 2; Fig. 4 is a rear elevation; Fig. 5 is detail on the line 5—5 of Fig. 1; Fig. 6 is a similar detail on the line 6—6 of Fig. 1 and Fig. 7 is a sectional plan of the differential mechanism.

The device comprises the usual channel frame 1 which in this case stops short of the rear axle. Secured to each side member of the frame and close to the end is a bracket 2, said bracket pivotally supporting at its upper end a link 3, this link provides a swinging pivotal bearing at 4 for a lever 5, said lever being secured to a link 6, which is supported by the rear axle housing 7. Intermediate of these two points a shackle 8 has pivotal connection at 9 to the lever 5 and engages at its lower end the eye of a spring 10, said spring being rigidly fixed to the frame 1 by means of the bracket 11 secured thereto, said spring may be of the cantaliver type if desired. This construction is duplicated upon the opposite side of the vehicle, and is transversely strengthened by the rod 30 which extends between the pivot points of the brackets 2.

Figure 7:
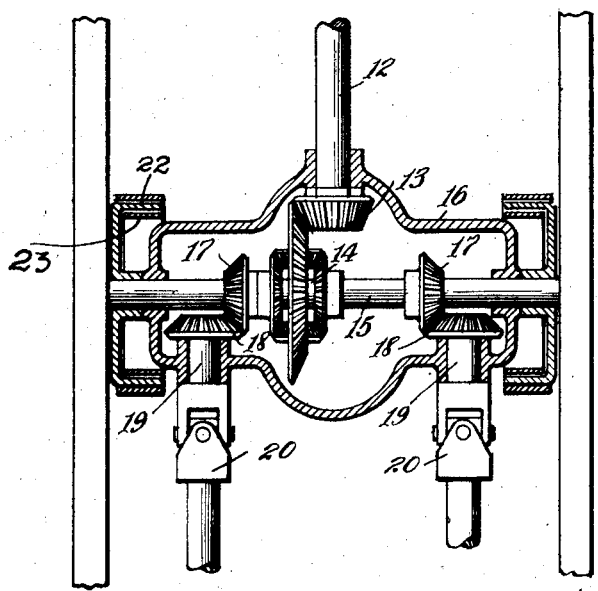

Referring particularly to Figs. 4 and 7 it will be seen that power is applied to each individual wheel allowing thereby an independent motion for each wheel.

A power shaft 12 having connection with the motor of the vehicle has a bevel pinion 13 meshing with the ring gear of a differential mechanism indicated generally at 14, and supported upon a transverse split shaft 15 supported within the housing 16. The shaft 15 is provided with miter gears 17 meshing with similar gears 18 upon the shaft 19 extending at right angles thereto and extending rearwardly to the axle and provided with universal joints 20 between the gear 18 and the gears 21 upon the rear axle, the gears 21 being supported in a suitable housing carried by the rear axle, this provides an independent drive for each rear wheel. The shaft 15 extends beyond the housing 16 where it is supported within bearings (not shown) secured to the frame 1. Brake drums 22 are secured to the shaft and are provided with internal and external brake bands 23 which may be actuated in the customary manner. It will thus be seen that no matter what the movement of the wheels, the brakes will not bind when the wheels encounter an obstruction, a fault heretofore found in the customary type of braking mechanism.

Since the motive power of motor driven vehicles as described above acts through the center of the driving shaft 24, in consequence of the resistance of the vehicle the link 6 will be inclined forwardly with respect to the pivot 30 when the vehicle is in forward motion. Any minor re-action will be upwardly and easily absorbed by the righting of this link.

Through the agency of the link 6 and the link 3 the jar and jolt produced by the shifting too quickly from low speed to a higher speed or the sudden starting or stopping of the vehicle is reduced to a minimum, the re-action of the links require little force to be exerted on the spring.

By means of this construction of links, levers and spring the re-action through the wheels is completely absorbed without movement of the body of the vehicle, since it will not only take care of the vertical but also the horizontal re-action.

Furthermore, a more resilient action is secured since any obstruction encountered will lengthen the lever arm 5 through the re-action of the point 7 while the lever arm of the spring through the point 9 is not materially lengthened and that through this increasing of one lever arm over the other I will secure a greater force producing deflection of the spring and consequently an easier deflection.

While I have shown and described this specific form in the above description, it is evident that various modifications of the same may be used and I do not wish to limit myself further than is required by the state of the art and that which is within the scope of the appended claims.

I claim:

1. The combination with a vehicle frame, side spring fixed thereto and axle housing, of a lever, links connecting opposite ends of the lever and the frame and housing respectively, and a link connecting the lever and the spring.

2. The combination with a vehicle frame, side spring fixed thereto, and axle housing behind the frame, of a lever flexibly connected to the frame and the housing respectively, and a link connecting the lever and the free rear end of the spring.

3. The combination with a vehicle frame, side spring fixed thereto, and a floating axle housing behind the frame, of a lever, a swinging link connecting the front end of the lever to the frame, a swing link connecting the rear end of the lever to the axle housing, and a swinging link connecting the rear end of the spring and the lever between the ends of the latter.

4. The combination with a vehicle frame, and an axle housing located behind the same, of a side spring fixed to the frame and having a rear free end projecting behind the frame, a lever, a swinging link connecting the front end of the lever and the frame, a swinging link connecting the rear end of the lever and the axle housing, and a swinging link connected at its upper end to the lever and at its lower end to the rear end of the spring.

5. The combination with a vehicle frame having side sills, of separate rear axle housings, an axle in each housing, springs between said housings and frame, a wheel upon the outer end of each axle, a differential driving gear between the side sills of the frame, and a driving connection between said gear and the inner end of each axle, each of said connections including a flexible longitudinal shaft, said shafts being located between the side sills.

In testimony whereof, I do affix my signature in presence of two witnesses.

ALVIN A. HANKE.

Witnesses:
JOHN A. BOMMHARDT,
ROBERT L. BRUCK.